(12) United States Patent
Dong

(10) Patent No.: US 8,571,362 B1
(45) Date of Patent: Oct. 29, 2013

(54) FORMING OPTICAL DEVICE USING MULTIPLE MASK FORMATION TECHNIQUES

(75) Inventor: Po Dong, Arcadia, CA (US)

(73) Assignee: Mellanox Technologies Ltd., Monterey Park, CA (US)

( * ) Notice: Subject to any disclaimer, the term of this patent is extended or adjusted under 35 U.S.C. 154(b) by 635 days.

(21) Appl. No.: 12/384,094

(22) Filed: Mar. 30, 2009

(51) Int. Cl.
*G02B 6/26* (2006.01)
*G02B 6/42* (2006.01)
*G02B 6/10* (2006.01)

(52) U.S. Cl.
USPC .............................. 385/31; 385/43; 385/129

(58) Field of Classification Search
USPC ...................... 385/31, 43, 129–132
See application file for complete search history.

(56) References Cited

U.S. PATENT DOCUMENTS

| 6,937,799 B2 * | 8/2005 | Matsushima et al. ........... 385/50 |
| 2005/0185893 A1 * | 8/2005 | Liu .................................. 385/50 |
| 2010/0065726 A1 * | 3/2010 | Zhong et al. ............. 250/227.24 |

OTHER PUBLICATIONS

M. Madou, "Fundamentals of Microfabrication" 1997, pp. 42-44, CRC Press LLC.

Runyan, et al., "Semiconductor Integrated Circuit Processing Technology," 1994, pp. 204-210, Addison-Wesley.

\* cited by examiner

*Primary Examiner* — Kevin S Wood
(74) *Attorney, Agent, or Firm* — Gavrilovich, Dodd & Lindsey, LLP

(57) ABSTRACT

An optical device includes a first region interfaced with a second region. The first region includes one or more surfaces that are formed using electron-beam lithography and the second region includes one or more surfaces that are formed using photolithography. A component crosses the interface and includes a first portion located in the first region and a second portion located in the second region. The component includes a light-signal carrying region that constrains light signals. The first portion includes a first taper that expands the light-signal carrying region as the component approaches the interface and the second portion includes a second taper that expands the light-signal carrying region as the component approaches the interface.

17 Claims, 5 Drawing Sheets

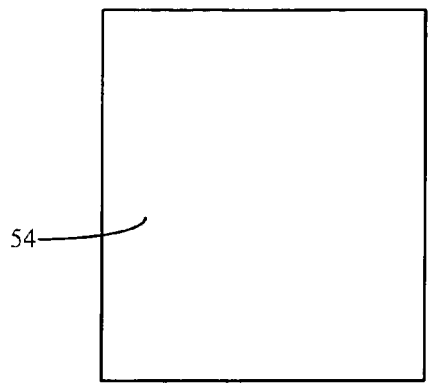
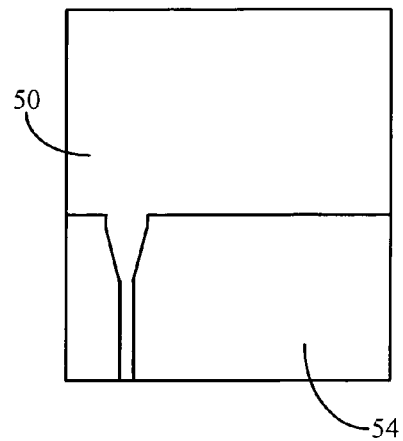
Figure 3A
Figure 3B
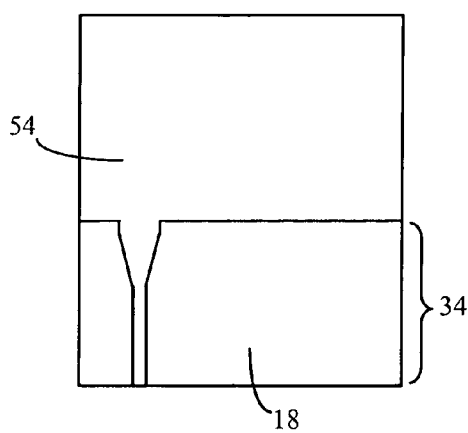
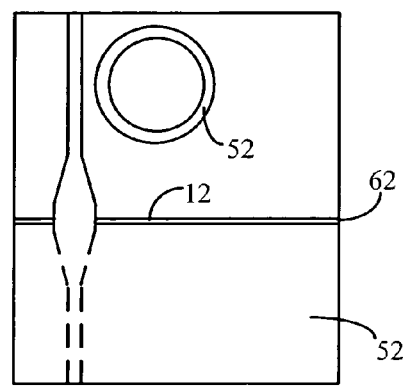
Figure 3C
Figure 3D
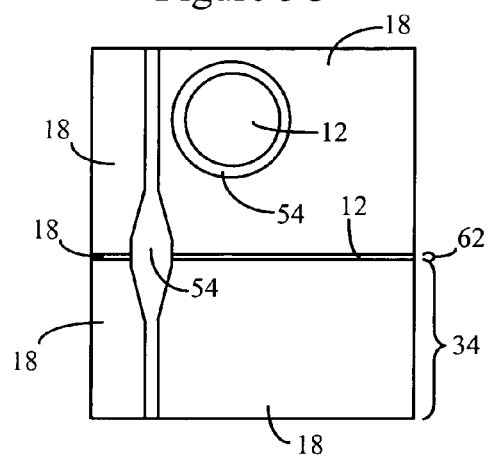
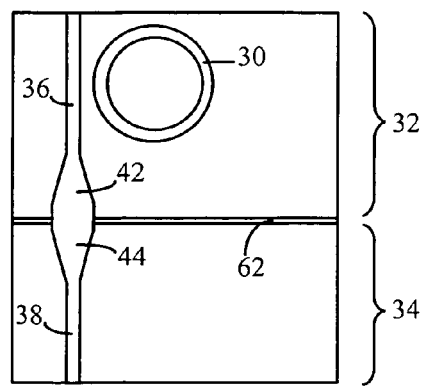
Figure 3E
Figure 3F

FORMING OPTICAL DEVICE USING MULTIPLE MASK FORMATION TECHNIQUES

GOVERNMENT SUPPORT

This invention was made with Government support under Agreement No. HR0011-08-9-0001 awarded by DARPA. The Government has certain rights in this invention.

FIELD

The present invention relates to optical devices and more particularly to methods of manufacturing optical devices.

BACKGROUND

The use of optical and/or optoelectronic devices is increasing in communications applications. These devices are often chips having waveguides and other features. These features can be formed by etching the chip while a patterned mask is positioned on the device. The mask pattern often requires nanometer level resolution in order to reduce the optical loss associated with the chip. Photolithography and electron beam lithography are examples of methods for forming these masks.

Photolithography uses light in order to develop/pattern a photoresist that serves as the mask. As a result, photolithography is suitable for quickly patterning large regions of a mask. However, due to diffraction, the resolution of the photolithography can be below the desired levels. Electron beam lithography can provide higher levels of resolution due to the shorter wavelength electrons in the electron beam. However, the mask in electron beam lithography is formed by drawing the electron beam over an electron-beam resist (e-beam resist) by using the electron beam as a pen. As a result, using electron-beam lithography to pattern large regions of an electron-beam resist can take undesirably long periods of time. As a result, electron-beam lithography is often not suitable for fabrication of these devices.

For the above reasons, there is a need for methods of fabricating optical devices.

SUMMARY

An optical device includes a first region interfaced with a second region. The first region includes one or more surfaces that are formed using electron-beam lithography and the second region includes one or more surfaces that are formed using photolithography. A component crosses the interface and includes a first portion located in the first region and a second portion located in the second region. The component includes a light-signal carrying region that constrains light signals. The first portion includes a first taper that expands the light-signal carrying region as the component approaches the interface and the second portion includes a second taper that expands the light-signal carrying region as the component approaches the interface.

One embodiment of the optical device includes a waveguide on a base. The waveguide has an interface between a first portion and a second portion. The first portion of the waveguide has one or more surfaces that each has features in accordance with a surface formed using a mask generated by electron-beam lithography. The second portion of the waveguide has one or more surfaces that each has features in accordance with a surface formed using a mask generated by photolithography. The first portion of the waveguide has a first taper that expands one or more dimensions of the waveguide as the first portion of the waveguide approaches the interface. The second portion of the waveguide has a second taper that expands one or more dimensions of the waveguide as the second portion of the waveguide approaches the interface.

BRIEF DESCRIPTION OF THE FIGURES

FIG. 1A is a perspective view of the optical device.

FIG. 1B is a cross-section of the device shown in FIG. 1A taken along the line labeled B.

FIG. 1C is a topview of the device shown in FIG. 1A.

FIG. 3A through FIG. 3F illustrate a method of forming an optical device constructed according to FIG. 1A through FIG. 1C.

DESCRIPTION

An optical device is fabricated using electron-beam lithography (EBL) to pattern a first mask for one or more first regions of the device and electron-beam lithography to pattern a second mask for one or more second regions of the device. The first regions of the device are regions of the device having features that require higher degree of pattern resolution that the second regions of the device. A feature on the device can be positioned in both a first region and in a second region. For instance, a waveguide can include a first portion in a first region and a second portion in a second region. As result, the waveguide includes an interface region between the first portion of the waveguide and the second portion of the waveguide.

Since the first portion of a feature having an interface region is formed by a different process than the second portion of the feature, the first portion of the feature must be aligned with the second portion of the feature. The difficulty in making this alignment can result in optical loss at the interface region. However, the first portion of the feature includes a first taper that expands the light signal-carrying region of the feature as it approaches the interface region. The second portion of the feature includes a second taper that expands the light signal-carrying region of the feature as it approaches the interface region. The first taper and the second taper meet at the interface region and can optionally come into contact with one another. The presence of the first taper and the second taper decreases the optical loss associated with misalignment of the first region and the second region. For instance, increasing size of the waveguide at the interface region causes any misalignment between the first portion of the waveguide and the second portion of the waveguide to affect a smaller percentage of the interface region than that alignment would affect if the first taper and the second taper were not present at the interface region. The reduction in the percentage of the interface region affected by the misalignment reduces the optical loss associated with this interface.

Figure 1A:
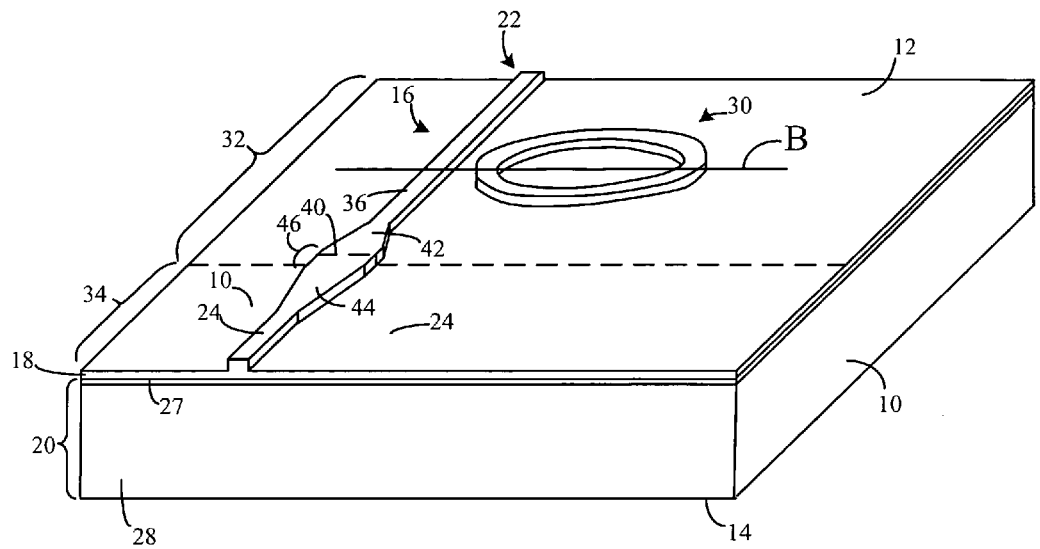
FIG. 1A through FIG. 1C illustrate an optical device having a feature positioned in both a first region and a second region. The first region is fabricated using a mask patterned with electron-beam lithography and the second region is fabricated using a mask pattered with photolithography. The feature is configured to reduce optical loss associated with the transition from the first region to the second region.
Figure 1B:
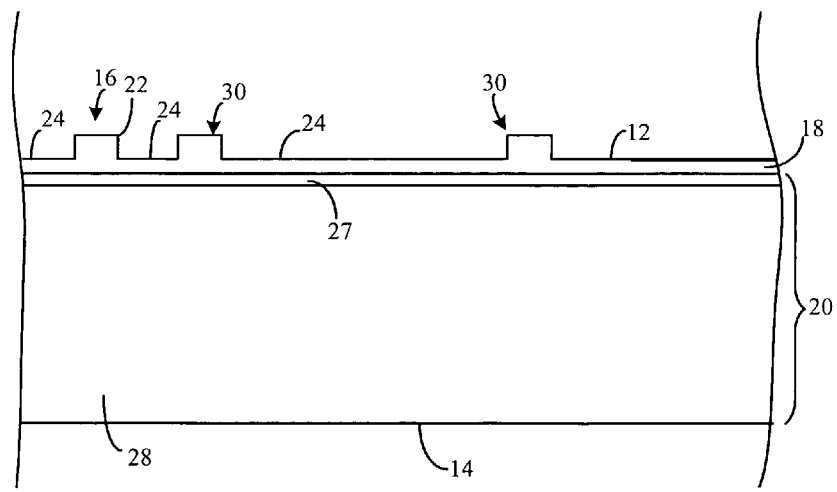
Figure 1C:
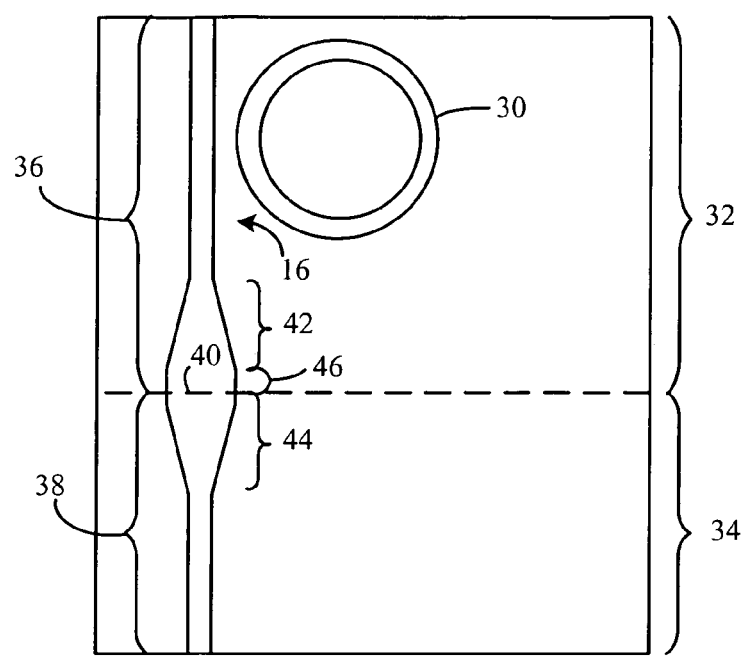

FIG. 1A through FIG. 1C illustrates an optical device having a first region 32 and a second region 34. FIG. 1A is a perspective view of the device. FIG. 1B is a cross-section of the device shown in FIG. 1A taken along the line labeled B. FIG. 1C is a topview of the device shown in FIG. 1A.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the topside of the base, the bottom side of the base, the topside of the substrate, and/or the bottom side of the substrate.

The illustrated device includes lateral sides 10 (or edges) extending from a topside 12 to a bottom side 14. The propagation direction of light signals along the length of the waveguides on a planar optical device generally extends through the lateral sides 10 of the device. The topside 12 and the bottom side 14 of the device are non-lateral sides.

The device includes one or more waveguides 16 that carry light signals to and/or from optical components. Examples of optical components that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, light sensors that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

The waveguide 16 is defined in a light-transmitting medium 18 positioned on a base 20. For instance, the waveguide 16 is partially defined by a ridge 22 defined by trenches 24 extending partially into the light-transmitting medium 18 or through the light-transmitting medium 18. Suitable light-transmitting media include, but are not limited to, silicon, polymers, silica, SiN, GaAs, InP and $LiNbO_3$. One or more cladding layers (not shown) are optionally positioned on the light-transmitting medium 18. The one or more cladding layers can serve as a cladding for the waveguide 16 and/or for the device. When the light-transmitting medium 18 is silicon, suitable cladding layers include, but are not limited to, silicon, polymers, silica, SiN, GaAs, InP and $LiNbO_3$.

The portion of the base 20 adjacent to the light-transmitting medium 18 is configured to reflect light signals from the waveguide 16 back into the waveguide 16 in order to constrain light signals in the light signal-carrying region of the waveguide 16. For instance, the portion of the base 20 adjacent to the light-transmitting medium 18 can be an optical insulator 27 with a lower index of refraction than the light-transmitting medium 18. The drop in the index of refraction can cause reflection of a light signal from the light-transmitting medium 18 back into the light-transmitting medium 18.

The base 20 can include the optical insulator 27 positioned on a substrate 28. As will become evident below, the substrate 28 can be configured to transmit light signals. For instance, the substrate 28 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate 28. The layer of silica can serving as the optical insulator 27 and the silicon substrate can serve as the substrate 28.

The optical device also includes a loop waveguide 30. The loop waveguide 30 can be included in an intensity modulator (not shown). During operation of the optical device, the waveguide 16 guides an input light signal to a region where the loop waveguide 30 is optically coupled with the waveguide 16. The waveguide 16 also carries an output light signal away from the region where the loop waveguide 30 is optically coupled with the waveguide 16. Accordingly, a first portion of the input light signal enters the loop waveguide 30 where it serves as a loop light signal. A second portion of the input light signal travels past the loop waveguide 30 and is included in the output light signal. When the phase difference between the loop light signal and the second portion of the input light signal is $n*2*\pi$ (n is an integer), there is constructive interference between the second portion of the input light signal and the loop light signal. As a result of the constructive interference, a larger portion of the input light signal enters the loop waveguide 30 from the waveguide 16. Accordingly, the constructive interference causes the intensity of the second portion of the input light signal to decrease and accordingly causes the intensity of the output signal to decrease. When the phase difference between the loop light signal and the second portion of the input light signal is not $n*2*\pi$, the constructive interference does not occur and the intensity of the output light signal does not experience the drop associated with the constructive interference.

Although not illustrated, the device can optionally include a phase modulator configured to modulate the phase difference between the second portion of the input light signal and the loop light signal. The phase modulator can be used to change the phase difference between the first portion of the light signal and the second portion of the input light signal. For instance, the phase modulator can be used to provide an $n*2*\pi$ phase differential between the first portion of the light signal and the second portion of the input light signal and accordingly decrease the intensity of the output light signal from the waveguide 16. As a result, the phase modulator can be used to control the intensity of the output light signal. Accordingly, the phase modulation results in the intensity modulation of the output light signal.

Although the phase modulator is not illustrated in FIG. 1A and FIG. 1B, construction of a ring resonator having a phase modulator included on waveguides 16 constructed according to FIG. 1A through FIG. 1B is disclosed in U.S. patent application Ser. No. 12/228,671, filed on Aug. 13, 2008, entitled "Electrooptic Silicon Modulator with Enhanced Bandwidth," and incorporated herein in its entirety. Accordingly, the disclosure of U.S. patent application Ser. No. 12/228,671 can be employed to generate an intensity modulator having waveguides arranged according to FIG. 1A through FIG. 1B.

During fabrication of an optical device constructed according to FIG. 1A through FIG. 1C, it is desirable for the loop waveguide 30 and the associated portion of the waveguide 16 to be fabricated with a higher degree of resolution than the remainder of the waveguide 16. As a result, the device has a first region 32 that includes the loop waveguide 30 and the associated portion of the waveguide 16. The first region 32 of the device is formed using a first mask 52 patterned with EBL. The device also has a second region 34 that includes the remaining portions of the waveguide 16. The second region 34 of the device is formed using a second mask 50 patterned with photolithography. As a result, the waveguide 16 has a first portion 36 included in the first region 32 and a second portion 38 included in the second region 34.

The first region 32 can contact the second region 34. Alternately, an interface zone (not shown) can be located between the first region 32 and the second region 34. The interface zone can be partially formed using a first mask 52 patterned by EBL and also using a second mask 50 patterned by photolithography. For instance, the first mask 52 and second mask 50 can overlap one another in the interface zone. Alternately, the interface zone can be etched with the first mask 52 and then the same region of the optical device can be etched with the second mask 50.

The first portion 36 of the waveguide 16 contacts the second portion 38 of the waveguide 16 at an interface region 40. The first portion 36 of the waveguide 16 includes a first taper 42 that expands a light signal carrying region of the waveguide 16 as the waveguide 16 approaches the interface region 40. Additionally, the second portion 38 of the waveguide 16 includes a second taper 44 that expands a light signal carrying region of the waveguide 16 as the waveguide 16 approaches the interface region 40.

The enlarged size of the waveguide 16 at the interface of the first region 32 and the second region 34 reduces optical loss that occurs as a result of misalignment between the first portion 36 of the waveguide 16 and the second portion 38 of the waveguide 16. For instance, waveguides used on communications devices often have a width of around 0.5 µm. Since misalignment can be on the order of 0.2 µm, the misalignment can occupy a large portion of the interface. However, if the first taper 42 and the second taper 44 expand the interface region 40 to about 3 micron, the 0.2 µm misalignment occupies a much smaller portion of the interface region 40. The misalignment occupying a smaller portion of the interface region reduces the optical loss that occurs at the interface of the first portion 36 of the waveguide 16 and the second portion 38 of the waveguide 16.

FIG. 1A through FIG. 1C illustrate the first taper 42 and the second taper 44 as only being horizontal tapers and excluding vertical tapers. However, the first taper 42 and/or the second taper 44 can optionally include vertical tapers that expand the light signal carrying region of the waveguide as the waveguide approaches the interface region 40.

FIG. 1A through FIG. 1B illustrate a connecting portion 46 of the waveguide 16 between the first taper 42 contacting the second taper 44. A suitable length for a connecting portion 46 is a distance less than 5 mm, 1 mm, and 0.1 mm. The connecting portion 46 of the waveguide 16 can connect the first taper 42 and the second taper 44 and can be unbranched and/or straight. Further, the connecting portion 46 of the waveguide 16 can be the only component between the first taper 42 and the second taper 44.

When a connecting portion 46 is between the first taper 42 and the second taper 44, the entire connecting portion 46 of the waveguide 16 can be in the first region 32, in the second region 34, or can be in both the first region 32 and the second region 34. When a connecting portion 46 of the waveguide 16 is between the first taper 42 and the second taper 44, the interface region preferably crosses the connecting portion 46 of the waveguide 16 in order to place misalignment of the first portion 36 and the second portion 38 in the connecting portion 46 of the waveguide 16 rather than on the first taper 42 or the second taper 44.

The connecting portion 46 of the waveguide 16 can be optional. For instance, the first taper 42 can contact the second taper 44. When a connecting portion 46 of the waveguide 16 is not between the first taper 42 and the second taper 44, the interface region preferably crosses the intersection between the first taper and the second taper in order to maximize the size of the waveguide at the interface region and accordingly reduce the optical loss associated with the interface region.

The first portion 36 of the waveguide 16 and the second portion 38 of the waveguide 16 can be single mode waveguides. Additionally, the first taper 42 and the second taper 44 can each be an adiabatic taper. The first taper 42 and/or the second taper 44 can each be single mode throughout their length and any connecting portion 46 between the first taper 42 and the second taper 44 can also be single mode. In some instance, the first portion 36 of the waveguide 16, the first taper 42, the second portion 38 of the waveguide 16, the second taper 44 and any connecting portion 46 between the first taper 42 and the second taper 44 are multimode. Alternately, the first taper 42 and the second taper 44 can each expand from a single mode portion to a multimode portion and any connecting portion 46 between the first taper 42 and the second taper 44 is multimode. In this structure, the multimode region between the single mode regions does not substantially affect performance since the light signals are contracted back to multimode dimensions.

The first portion 36 of the optical device is formed by electron beam lithography and the second portion 38 of the optical device is formed by photolithography. Photolithography involves depositing a mask precursor on the optical device. The mask precursor is developed and patterned to form the mask (often called a photoresist). For instance, the mask precursor is developed and patterned by exposing the mask precursor to light through a photomask that includes the pattern to be transferred onto the optical device. The mask is then formed by removing the undeveloped portion of the mask precursor from the device precursor.

Electron beam lithography also involves depositing a mask precursor on the optical device. The mask precursor is developed and patterned to form the mask (often called an e-beam resist). For instance, the mask precursor can be developed and patterned by drawing the electron beam across the mask precursor so as to create a mask having the desired pattern. Since the pattern is a result of the pattern in which the e-beam is drawn, electron beam lithography does not require a photomask as is used in the photolithography.

The surfaces formed on the optical device as a result of electron beam lithography can be distinguished from surfaces formed as a result of photolithography. For instance, surfaces formed using electron beam lithography have higher feature resolution and higher sidewall smoothness than surfaces formed using photolithography.

FIG. 2A through FIG. 2D illustrate a method of forming an optical device having a region formed by electron beam lithography and a region formed by photolithography. The method is illustrated on a silicon-on-insulator wafer but can be adapted to other platforms.

Figure 2A:
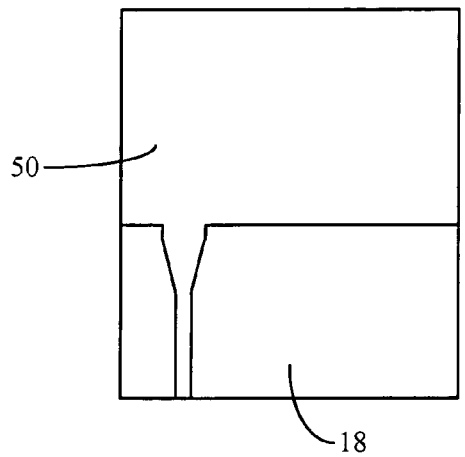
FIG. 2A through FIG. 2D illustrate a method of forming an optical device constructed according to FIG. 1A through FIG. 1C.

Photolithography is used to formed a second mask 50 (photoresist) on an optical device precursor as illustrated in FIG. 2A. FIG. 2A is a topview of the optical device precursor. The second mask 50 is formed so as to protect the region of the device precursor where the second portion 38 of the waveguide 16 will be formed while the remainder of the second region 34 remains exposed. Additionally, the second mask 50 protects the first region 32.

Figure 2B:
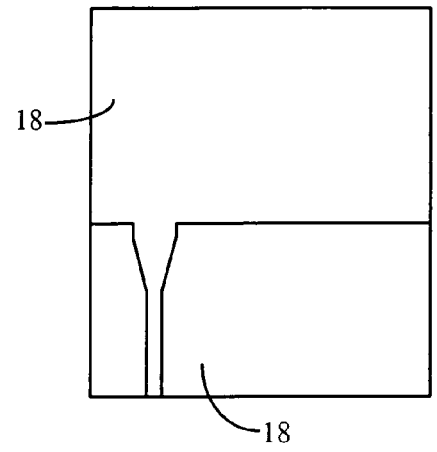

The device precursor of FIG. 2A is etched and the second mask 50 is removed to provide the device precursor illustrated in FIG. 2B. FIG. 2B is a topview of the optical device precursor. The etch forms the lateral surfaces on the second portion 38 of the waveguide 16. Accordingly, the first etch is performed for a duration that provides the lateral surfaces with the desired height.

Figure 2C:
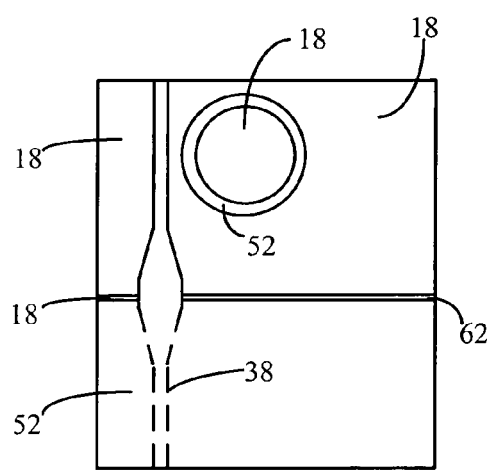

Electron beam lithography is used to form a first mask 52 (e-beam resist) on the device precursor of FIG. 2B so as to generate the device precursor of FIG. 2C. FIG. 2C is a topview of the optical device precursor. The first mask 52 overlaps the second portion 38 of the waveguide 16. As a result, the features of the second portion 38 of the waveguide 16 that are located under the first mask 52 are shown as dashed lines. The first mask 52 is formed so as to protect the region of the device precursor where the first portion 36 of the waveguide 16 and the loop waveguide 30 will be formed while the remainder of the first region 32 remains exposed. Additionally, the first mask 52 protects a portion of the second region 34 but leaves exposed an interface zone between the first region 32 and the second region 34.

Figure 2D:
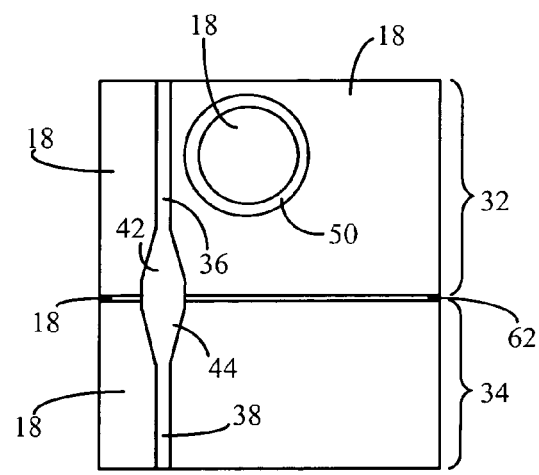

The device precursor of FIG. 2C is etched and the first mask 52 is removed to provide the device precursor illustrated in FIG. 2D. FIG. 2D is a topview of the optical device precursor. The second etch forms the lateral surfaces of the first portion 36 of the waveguide 16 and the loop waveguide 30. Accordingly, the second etch is performed for a duration that provides these lateral surfaces with the desired height. Since the first region 32 and the second region 34 were each exposed to only one of the etches but the interface zone 62 is exposed during both the first etch and the second etch, the interface zone 62 may still be visible in the resulting optical device. Preferably, the interface zone 62 will not be exposed to either of the etches and will form a 'wall' feature at the interface.

Although FIG. 2A through FIG. 2D illustrate the second portion 38 of the waveguide 16 formed before the first portion 36 of the waveguide 16, the sequence of steps discussed with respect to FIG. 2A through FIG. 2D can be changed so as to form the first portion 36 of the waveguide 16 before the second portion 38 of the waveguide.

The method of FIG. 2A through FIG. 2D forms different portions of the waveguide 16 during different etches. However, in some instances, it may be desirable to form the different portions of the waveguide 16 during a single etch. FIG. 3A through FIG. 3F illustrate a method of forming the different portions of the waveguide 16 during a single etch. The method is illustrated on a silicon-on-insulator wafer but can be adapted to other platforms.

A hard mask 54 is deposited on a device precursor so as to provide the device precursor of FIG. 3A. When the light-transmitting medium 18 is silicon, a suitable hard mask 54 includes, but is not limited to, silica. Photolithography is used to formed a second mask 50 (photoresist) on the optical device precursor of FIG. 3A so as to provide the optical device precursor of FIG. 3B. The second mask 50 is formed so as to protect the region of the device precursor where the second portion 38 of the waveguide 16 will be formed while the remainder of the second region 34 remains exposed. Additionally, the second mask 50 protects the first region 32.

The device precursor of FIG. 3B is etched and the second mask 50 is removed to provide the device precursor illustrated in FIG. 3C. FIG. 3C is a topview of the optical device precursor. The etch patterns the hard mask 54 such that the hard mask 54 protects the region of the device precursor where the second portion 38 of the waveguide 16 will be formed while hard mask 54 leaves the remainder of the second region 34 exposed. Additionally, the hard mask 54 protects the first region 32. The first etch can be selective for the hard mask 54 material over the light-transmitting medium 18. As a result, the light-transmitting medium 18 can act as an etch stop during the first etch.

Electron beam lithography is used to form a first mask 52 (e-beam resist) on the device precursor of FIG. 3C so as to generate the device precursor of FIG. 3D. FIG. 3D is a topview of the optical device precursor. The first mask 52 is positioned over a portion of the remaining hard mask 54. As a result, the features of the second portion 38 of the waveguide 16 that are located under the first mask 52 are shown as dashed lines. The first mask 52 is formed so as to protect the region of the device precursor where the first portion 36 of the waveguide 16 and the loop waveguide 30 will be formed while the first mask 52 does not protect the remainder of the first region 32. Additionally, the first mask 52 protects a portion of the second region 34 but does not protect an interface zone 62 between the portion of the hard mask 54 protecting the first region 32 and the portion of the first mask 52 protecting the second region 34.

The device precursor of FIG. 3D is etched and the first mask 52 is removed to provide the device precursor illustrated in FIG. 3E. FIG. 3E is a topview of the optical device precursor. The second etch patterns the portion of the hard mask 54 that protects the first portion 36 of the waveguide 16 and the loop waveguide 30. Accordingly, the portion of the hard mask 54 that protects the first portion 36 of the waveguide 16, the second portion 38 of the waveguide 16, and the loop waveguide 30 remain in place on the optical device. The second etch can be selective for the hard mask 54 material over the light-transmitting medium 18. As a result, the light-transmitting medium 18 can act as an etch stop during the first etch. Further, the selectivity of the second etch can reduce etching of the silicon exposed in the interface zone 62 during the second etch. However, since the portion of the hard mask 54 that defines the first region 32 and the second region 34 were each exposed to only one of the etches but the interface zone 62 is exposed during both the first etch and the second etch, the interface zone 62 may still be visible in the resulting optical device.

A third etch is performed on the device precursor of FIG. 3E and the hard mask 54 is removed so as to provide the optical device illustrated in FIG. 3F. FIG. 3F is a topview of the optical device. The third etch forms the lateral surfaces of the first portion 36 of the waveguide 16, the second portion 38 of the waveguide 16, and the loop waveguide 30. Accordingly, the second etch is performed for a duration that provides these lateral surfaces with the desired height.

Figure 4:
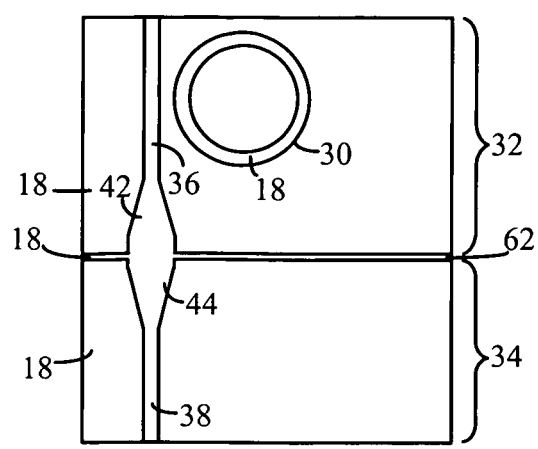
FIG. 4 is a topview of an optical device constructed according to a modified version of the methods illustrated in FIG. 2A through FIG. 3F.

Although the methods of FIG. 2A through FIG. 3F are performed such that the interface zone 62 is exposed during both the first etch and the second etch, the first mask 52 and the second mask 50 can be generated such that the interface zone 62 are protected during both the first etch and the second etch. For instance, the second mask 50 can be positioned over the interface zone 62 during the first etch and the first mask 52 can be positioned over the interface zone during the second etch. The result of this approach is that the interface zone will include a wall extending upward from the base and across the waveguide. The top of the wall can be at the same height above the base as the top of the waveguide. A topview of an optical device generated according to such a method is illustrated in FIG. 4.

Although the optical device and methods of manufacture are illustrated above with a waveguide 16 having the tapers, the principle can be applied to features other than waveguides. For instance, features and components such as star couplers, echelle gratings, etc. can be positioned in both a first region 32 and in a second region 34. These features can also include tapers as disclosed above.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
 a waveguide on a base, the waveguide having an interface between a first portion and a second portion,
  the first portion of the waveguide having one or more surfaces that each has features in accordance with a surface formed using a mask generated by electron-beam lithography,
  the second portion of the waveguide having one or more surfaces that each has features in accordance with a surface formed using a mask generated by photolithography,
  the first portion of the waveguide having a first taper that expands one or more dimensions of the waveguide as the first portion of the waveguide approaches the interface, and
  the second portion of the waveguide having a second taper that expands one or more dimensions of the waveguide as the second portion of the waveguide approaches the interface.

2. The device of claim 1, wherein an unbranched portion of the waveguide connects the first taper to the second taper.

3. The device of claim 1, wherein the first taper and the second taper each include a horizontal taper.

4. The device of claim 1, wherein the first taper contacts the second taper.

5. The device of claim 1, wherein the first taper is located entirely in the first region and the second taper is located entirely in the second region.

6. The device of claim 1, wherein the waveguide is configured to guide a light signal through a light-transmitting medium, a portion of the light-transmitting medium extending continuously from within the first portion of the waveguide, through the interface, and then into the second portion of the waveguide.

7. The device of claim 1, wherein the waveguide is configured to guide a light signal through a light-transmitting medium, the light-transmitting medium included in the first portion of the waveguide being the same as the same as the light-transmitting medium included in the second portion of the waveguide.

8. The device of claim 1, wherein the one or more surfaces of the first portion of the waveguide are smoother than the one or more surfaces of the second portion of the waveguide.

9. A method of forming an optical device, comprising:
 etching a device so as to define a waveguide on a base, the waveguide having an interface between a first portion and a second portion,
  the first portion of the waveguide having one or more surfaces defined by an electron-beam lithography mask,
  the second portion of the waveguide having one or more surfaces defined by a second mask generated by photolithography,
  the first portion of the waveguide having a first taper that expands one or more dimensions of the waveguide as the first portion of the waveguide approaches the interface, and
  the second portion of the waveguide having a second taper that expands one or more dimensions of the waveguide as the second portion of the waveguide approaches the interface.

10. The method of claim 9, wherein the first mask and the second mask are both in place on the device during the etch.

11. The method of claim 9, wherein etching the device includes etching the first portion of the waveguide concurrently with the second portion of the waveguide.

12. The method of claim 9, wherein etching the device includes etching the first portion of the waveguide and the second portion of the waveguide sequentially.

13. The method of claim 9, wherein the waveguide is configured to guide a light signal through a light-transmitting medium, the light-transmitting medium extending from the first portion of the waveguide, through the interface, and then into the second portion of the waveguide.

14. The method of claim 9, wherein the waveguide is configured to guide a light signal through a light-transmitting medium, the light-transmitting medium included in the first portion of the waveguide being the same as the same as the light-transmitting medium included in the second portion of the waveguide.

15. The method of claim 14, wherein the light-transmitting medium is elemental silicon.

16. The method of claim 9, wherein the one or more surfaces of the first portion of the waveguide are smoother than the one or more surfaces of the second portion of the waveguide.

17. The method of claim 9, further comprising:
 employing electron-beam lithography to form the electron-beam lithography mask; and
 employing photolithography to from the second mask.

* * * * *